F. M. SMITH.
REFRIGERATOR.
APPLICATION FILED NOV. 8, 1909.

1,005,343.

Patented Oct. 10, 1911.

7 SHEETS—SHEET 5.

WITNESSES:
Wm F. Doyle
R. E. Barry.

INVENTOR
Frank M. Smith
BY Whitaker Prevost
Attorneys

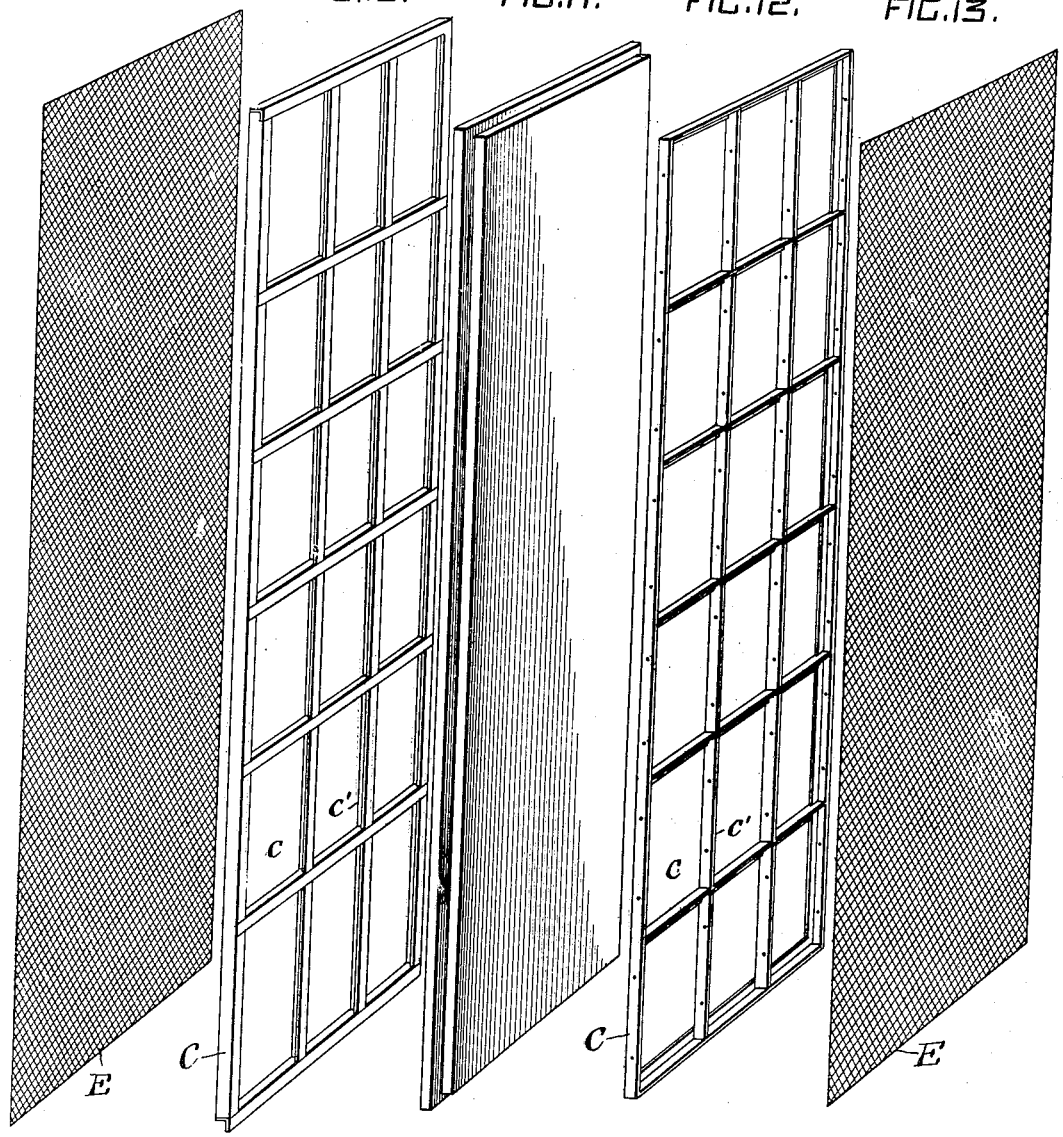

UNITED STATES PATENT OFFICE.

FRANK M. SMITH, OF NEW YORK, N. Y.

REFRIGERATOR.

1,005,343.

Specification of Letters Patent.  Patented Oct. 10, 1911.

Application filed November 8, 1909. Serial No. 526,810.

*To all whom it may concern:*

Be it known that I, FRANK M. SMITH, citizen of the United States, residing at New York, in the county of New York and State of New York, have invented certain new and useful Improvements in Refrigerators; and I do hereby declare the following to be a full, clear, and exact description of the invention, such as will enable others skilled in the art to which it appertains to make and use the same.

My invention consists in certain new and useful improvements in refrigerators and contemplates the use of a hollow metal drum, which forms the core of the main body of the refrigerator, to which are secured on both sides thereof, spacing and supporting bars carrying metal lathing or perforated sheet metal or wire netting, adapted to retain thereon an exterior coating of cement.

A main frame with rounded corners surrounds the edges of the refrigerator and the coating of cement is flush with the outer edges of the frame.

The object of my invention is to provide a thoroughly hygienic refrigerator which can be cheaply constructed, and yet be very strong, and readily kept clean.

My invention also contains other novel features which will be pointed out hereafter.

In order that my invention may be clearly understood, I have illustrated it in the accompanying drawings and described it in the following specification and claims.

Figure 1:
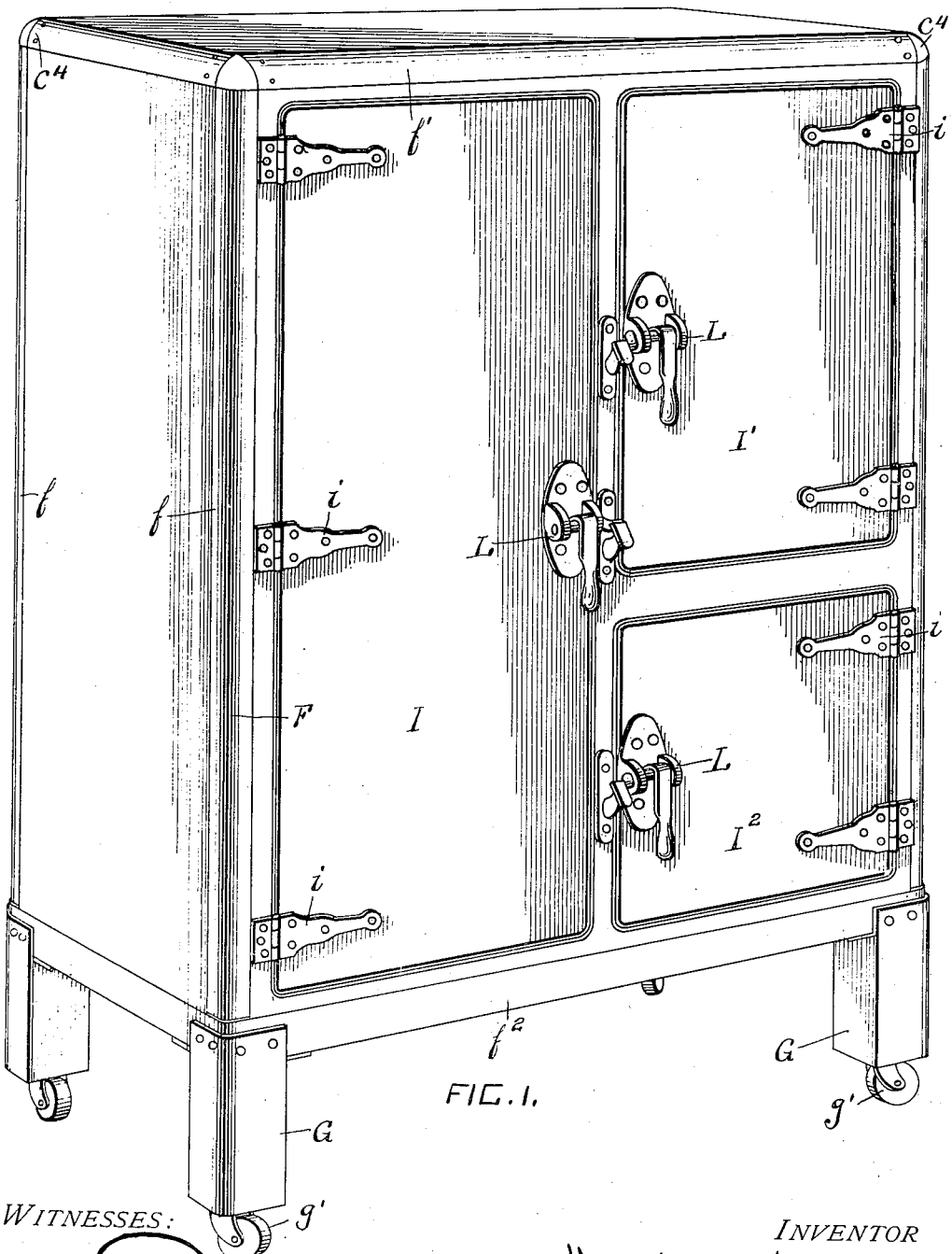
Figure 2:
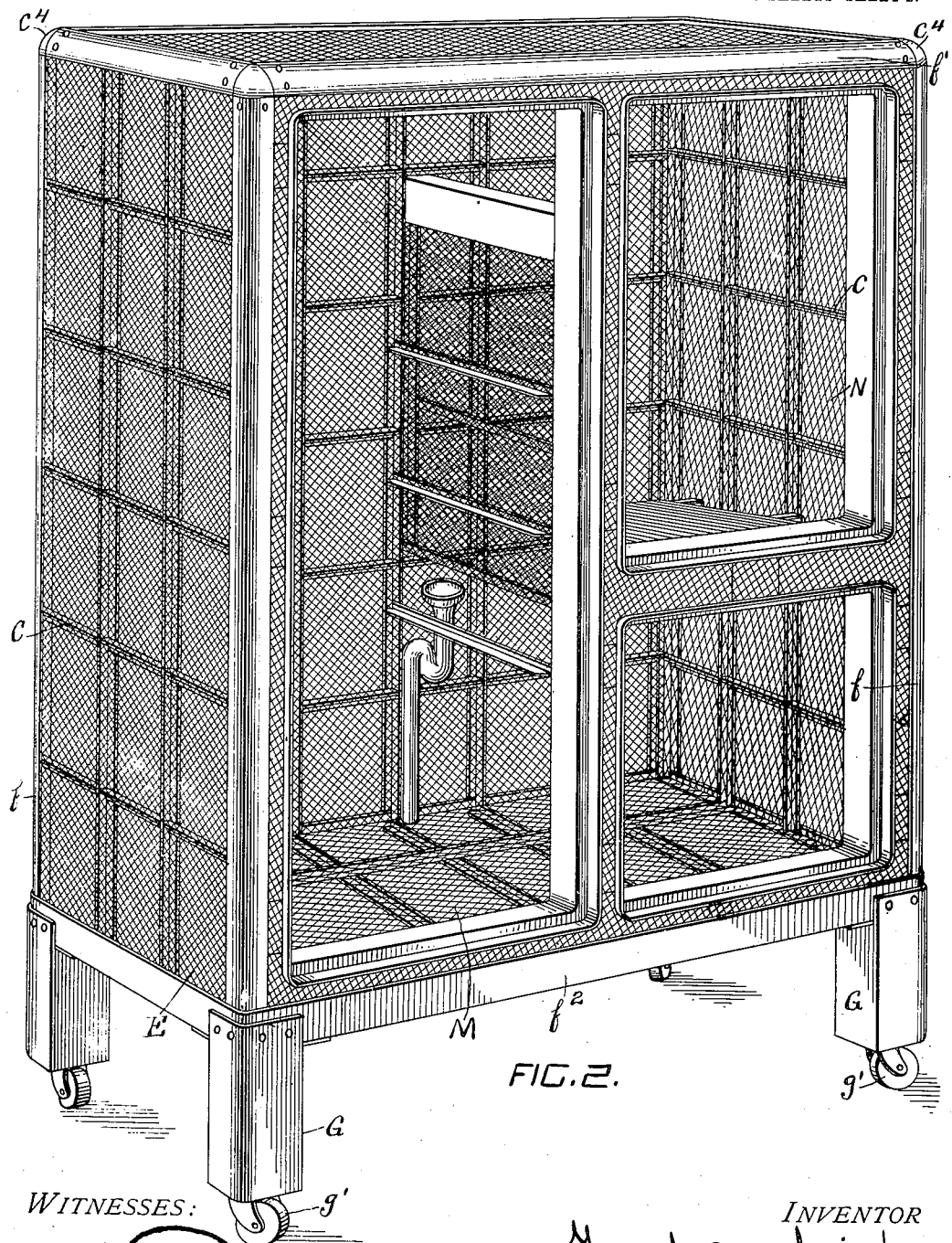
Figure 3:
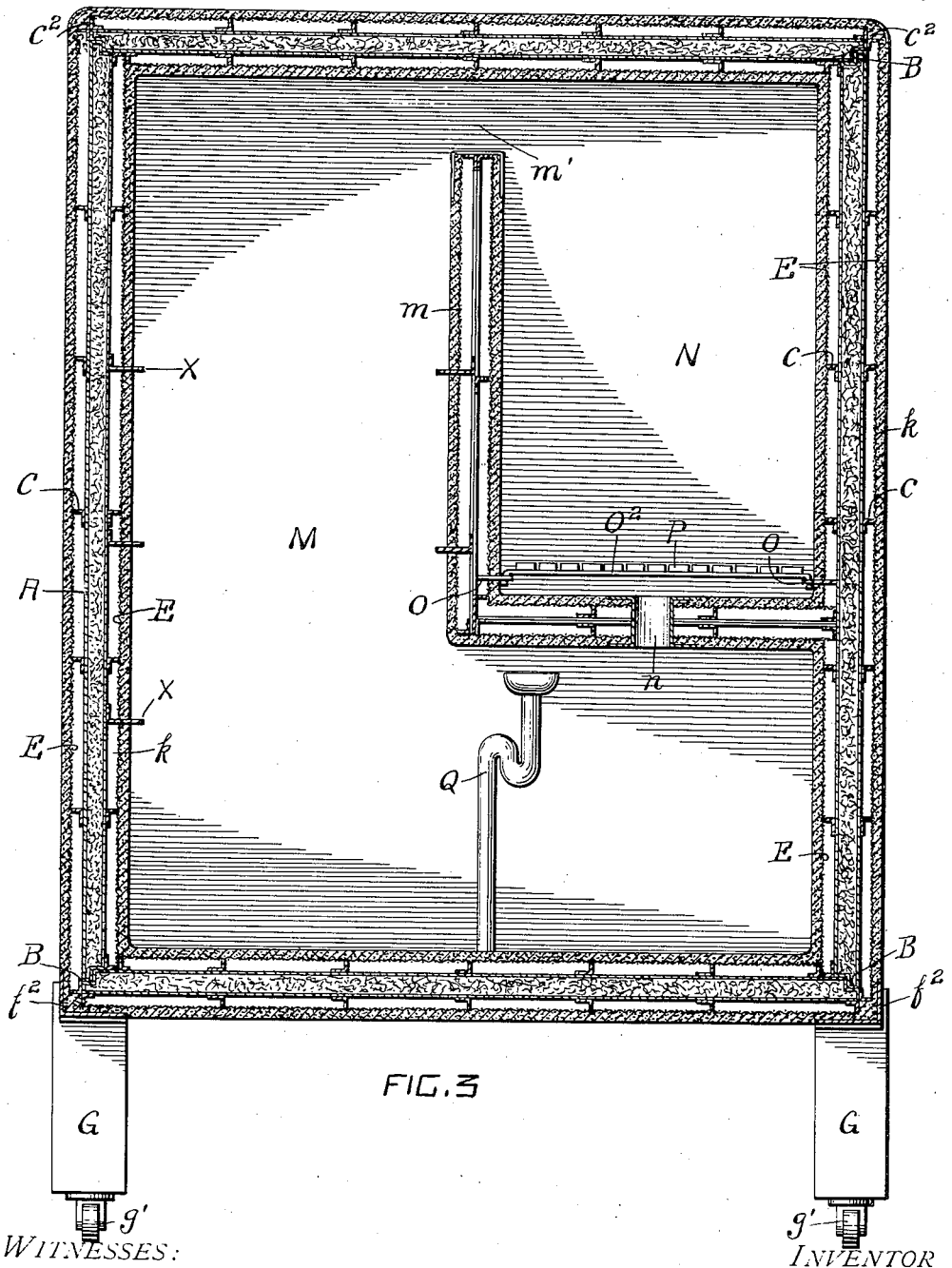
Figure 4:
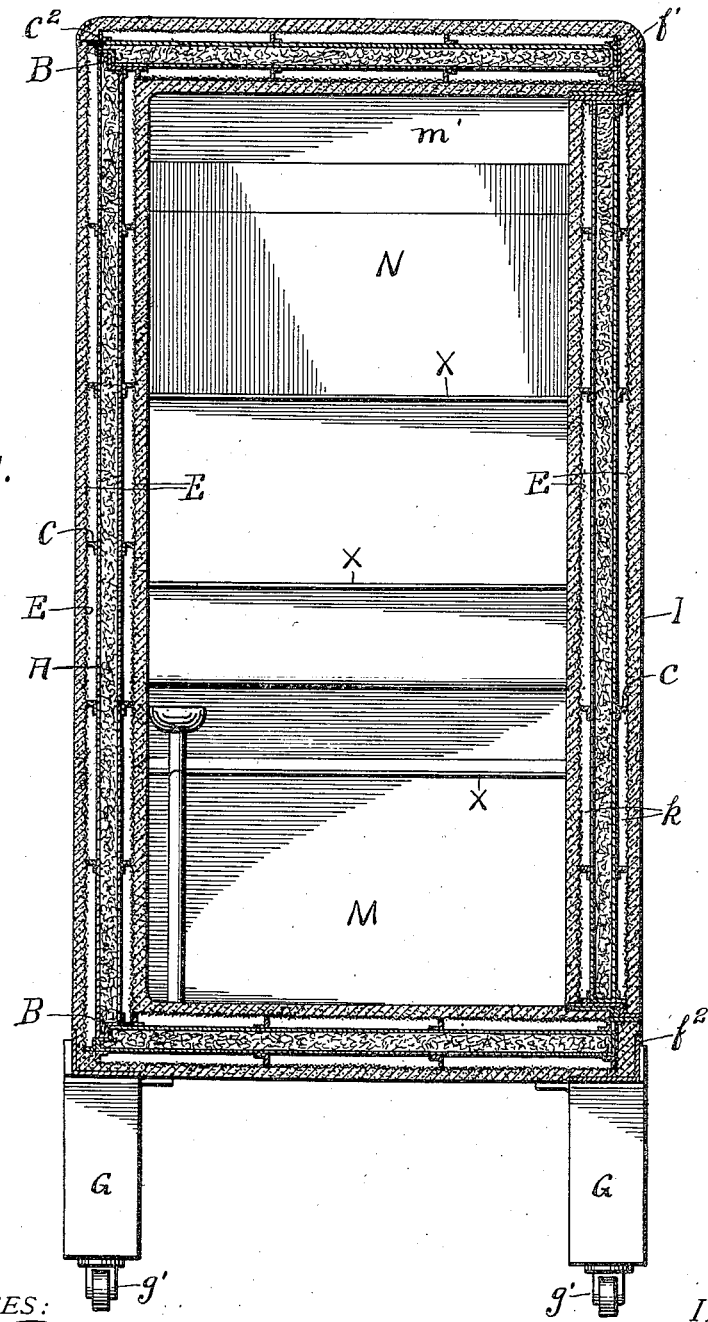
Figure 5:
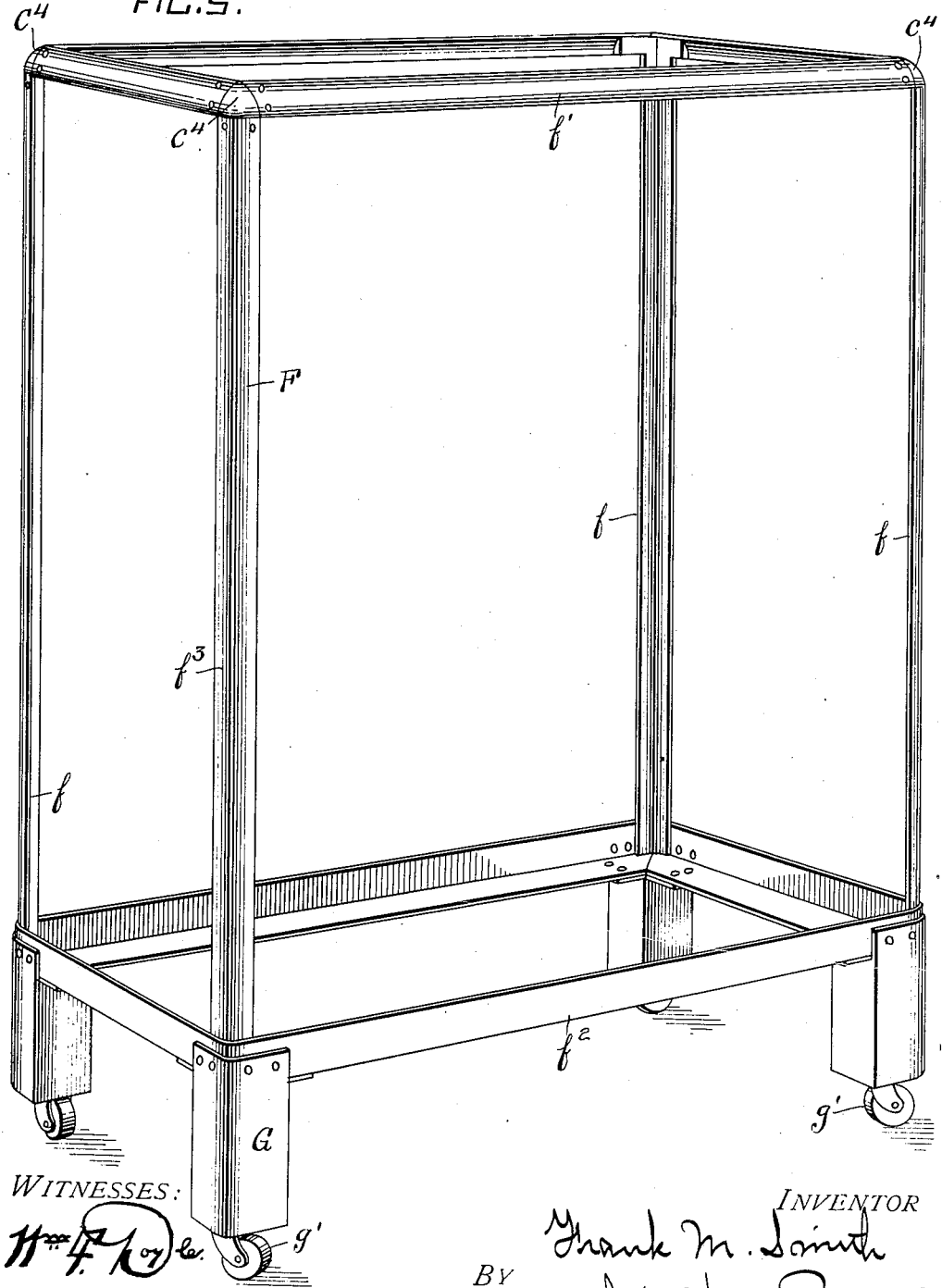
Figure 6:
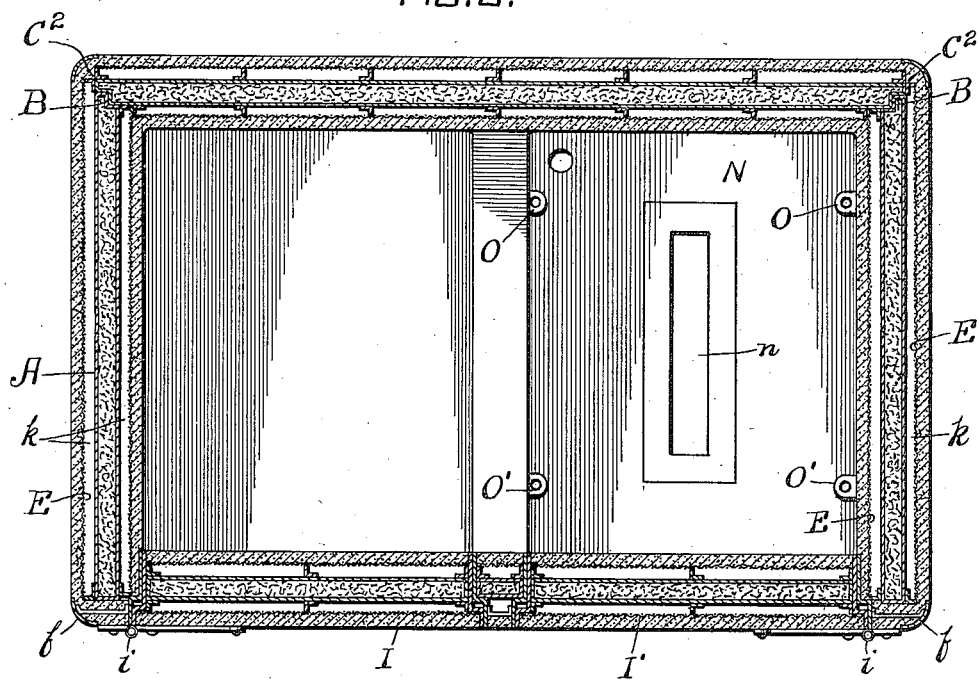
Figure 8:
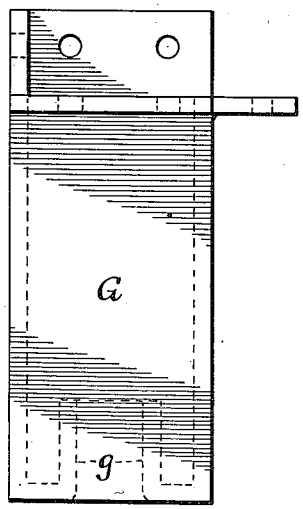
Figure 7:
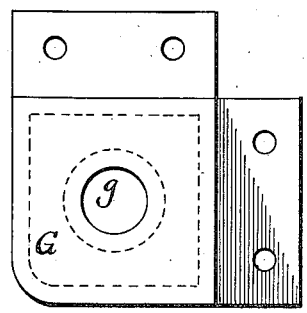

In the drawings, Figure 1 is a perspective view of my improved refrigerator complete. Fig. 2 is a similar view without the cement coating and with the doors removed. Fig. 3 is a longitudinal vertical sectional view. Fig. 4 is a transverse vertical section. Fig. 5 is a perspective view of the frame. Fig. 6 is a horizontal sectional view. Fig. 7 is a plan view of the under side of the caster block. Fig. 8 is a side view of the same. Figs. 9, 10, 11, 12 and 13 are views showing the different parts of which the sides and doors of the refrigerator are constructed.

Similar letters of reference indicate identical parts throughout.

A represents a drum with double walls preferably made of steel and which forms the core of the three sides, top and bottom of the refrigerator, and of the doors. This drum is preferably constructed in sections, each section forming a side of the refrigerator, the said sections being secured together at their ends in any desired manner, but being preferably rabbeted as shown at B in Fig. 3, where the ends appear mutually recessed and matched, angle irons and bolts and nuts being used to secure them together.

The hollow space between the walls of the drum is filled with a non heat conducting material, preferably baked cork. On both sides of the drum without and within, are secured by any preferred means, such as bolts or screws, angle irons C which extend lengthwise and crosswise of the sections of the drum and intersect each other, as shown, so that the edges of the projecting flanges $c$, $c'$ of the said angle irons, are flush with each other, and the other flanges of said angle irons lie close against the sides of the drum. The angle irons are preferably so arranged as to form corner recesses $c^2$ at the edges of the refrigerator.

E represents a perforated metal sheet, which is adapted to be placed over the angle irons within and without the refrigerator and secured to the irons by any preferred means, as by wiring or by means of clamps.

F represents a metal frame in which the main body of the refrigerator sets, and consists of the upright pieces $f$, and the horizontal pieces $f'$ and $f^2$, all formed approximately as shown in Fig. 5, of the drawings, and bolted together at their ends. The pieces $f^2$ are made in the form of angle irons with square corners and the pieces $f$, $f'$ are substantially of the same shape, except that their corners $f^3$ are rounded, and the upper ends of the pieces $f$ and the ends of the horizontal pieces $f'$ are mitered and rounded as shown at $c^4$.

It will be noted that when the body of the refrigerator, as thus far described, is placed within the frame F, the edges of the pieces forming the said frame will project slightly beyond the perforated sheet metal covering of the angle irons, thus forming a gage for the coating of cement hereafter referred to.

G represents a caster block which is preferably constructed of malleable iron, and as shown in the drawings, is bolted to the sides of the frame and from underneath the same, see Figs. 7 and 8. The caster block is provided with a socket $g$ to receive the shank of the caster $g'$.

After the perforated sheet metal sides are fixed in place, the body of the refrigerator is placed in the frame F and a coating of cement in a suitably plastic state, is applied to the perforated sheet metal, or metal lath, secured to the edges of the angle irons, and this coating adheres to the same and keys itself securely through the perforations or interstices. The cement may be applied to the bottom of the body of the refrigerator before the said body is placed in the frame, as shown in the drawings. The thickness of the cement coating is gaged by the edges of the frame F, and it is obvious that after the coating is applied, within and without the refrigerator, there will be presented a perfectly smooth surface within and without the refrigerator, with no corners in which unsanitary matter may accumulate. It is obvious that after the cement coating is applied, air spaces $k, k$ are formed on either side of the drum and between the drum and the inner surface of the cement coating, which add very materially to the efficiency of the refrigerator.

I, I', I² represent the doors of the various compartments of the refrigerator, which may be varied in number as desired. These doors are constructed exactly in the same manner as the sides of the refrigerator, just described, and are provided with hinges $i$ bolted to the doors and to the frame F. The edges of the doors and the portions of the frame meeting the same, are rabbeted or stepped and so constructed that when the doors are closed, they are flush with the outer surface of the refrigerator and the edges of the doors and of the frame are provided with suitable packing such as strips of rubber, which when the doors are closed prevent warm air from entering, or cold air from escaping. The doors are provided with latches L of any desired construction, but I preferably use what is termed a lever lock as shown.

The interior of my improved refrigerator may be arranged to suit the needs of a user or the ideas of a manufacturer. In the form which I have shown in the drawings, the interior is practically arranged in two compartments M and N, the latter forming the ice chest proper, and the compartment M extending along side of and underneath the compartment N. The vertical and horizontal partitions of the compartment N which separate it from the compartment M, may be made exactly as already described, in constructing the sides, with the hollow drum filled with baked cork or other similar material, the angle irons on both sides of the same, the perforated sheet metal or its equivalent, over said angle irons and the coating of cement within and without the chamber. The vertical partition $m$ extends to nearly the top of the refrigerator, thus leaving a space $m'$ for the circulation of air. The bottom of the chamber N is provided with an opening $n$, also for the purpose of permitting the circulation of air through the chamber M. Projections $o$ are provided near the bottom of the chamber N and on the sides thereof having openings $o'$ therethrough to receive supports $o^2$ of the ice rack P which is perforated. This construction may be modified as desired, however. The bottom of the chamber N is slightly sloping so as to carry off the water resulting from the melting ice through the trap Q, as shown in Fig. 3. In the chamber M certain of the angle irons are extended through the wire netting or perforated sheet metal and cement coating, as at X, X, to form supports for shelving.

It is obvious that when articles to be refrigerated are placed in the chamber M, the air will circulate through the openings $n$ and $m'$ and through the chamber M, thus maintaining the chamber M at a low degree of temperature. After the cement coating is applied to the exterior and interior of the refrigerator and the partitions and doors thereof, the refrigerator is baked for a predetermined period, and after cooling, any desired finish may be applied.

While I have shown a preferred form of my improved refrigerator, I do not limit myself to this form as I may vary it without departing from the spirit of my invention. For example, the refrigerator may be made round and the core or hollow drum constructed of two integral sheets of metal for the sides with a space left between them, and the other parts added as described, the top and bottom being similarly constructed.

What I claim and desire to secure by Letters Patent is:—

1. A refrigerator comprising a metallic drum having hollow walls filled with non heat conducting material, spacing parts secured to the inner and outer faces of the walls of said drum, a metallic sheathing secured to said spacing parts within and without the drum and a coating of cement upon said sheathing within and without said drum whereby air spaces are formed on both sides of the metallic drum.

2. A refrigerator comprising a metallic drum having hollow walls filled with non heat conducting material, spacing parts secured to the inner and outer faces of the walls of said drum, a metallic sheathing secured to said spacing parts within and without the drum and a coating of cement upon the sheathing within and without the drum, door apertures in one wall of the refrigerator, doors movably secured in and fitting said apertures, said doors being constructed in the same manner as the walls of the refrigerator.

3. A refrigerator the sides, top and bottom of which are formed of hollow metallic sections filled with non heat conducting material, spacing parts secured to both sides of said sections, metallic sheathing secured to said spacing parts, a cement coating for said sheathing, a metallic frame adapted to surround and support the refrigerator body, said frame engaging the cement coating and being separated thereby from contact with the sheathing or any metallic part of the drum.

4. A refrigerator comprising a metallic drum having hollow walls filled with non heat conducting material, spacing parts secured to the inner and outer faces of the walls of said drum, a metallic sheathing secured to said spacing parts within and without the drum, a coating of cement for said sheathing, a metallic skeleton frame provided with floor engaging supports, to receive and support the refrigerator body, said skeleton frame being embedded in the exterior cement covering of the drum and held thereby out of contact with the sheathing and all metallic parts of the drum.

5. A refrigerator, the sides, top and bottom of which are formed of hollow metallic sections filled with non heat conducting material, intersecting angle irons secured to both sides of said hollow sections, the projecting flanges of the exterior angle irons being flush with each other, a metallic sheathing for said angle irons, a coating of cement for said sheathing within and without the refrigerator, the oppositely disposed horizontal flanges of certain of the interior angle irons being projected through the cement coating to form supports for shelving.

6. In a refrigerator, a skeleton metallic frame to surround and support the main body of the refrigerator, said frame comprising a rectangular horizontal open base portion formed of angle irons, the corners being curved in cross section, vertical curved corner pieces secured to the rectangular base and a rectangular horizontal top portion connecting the upper ends of the vertical corner pieces, the entire frame being embedded in cement after the body of the refrigerator is placed therein, the said cement holding the frame out of contact with any metallic part of the body.

In testimony whereof I affix my signature, in the presence of two witnesses.

FRANK M. SMITH.

Witnesses:
J. K. MOORE,
R. E. BARRY.